United States Patent [19]

Johnson

[11] Patent Number: 4,810,785

[45] Date of Patent: Mar. 7, 1989

[54] CROSSLINKED CORN BRAN AND UTILIZATION IN PAPERMAKING

[75] Inventor: Donald L. Johnson, Muscatine, Iowa

[73] Assignee: A. E. Staley Manufacturing Company, Decatur, Ill.

[21] Appl. No.: 74,846

[22] Filed: Jul. 17, 1987

[51] Int. Cl.$^4$ .................. C08B 31/00; C13L 1/08
[52] U.S. Cl. ..................... 536/106; 426/463; 127/70; 127/32; 127/33; 162/175
[58] Field of Search .................. 536/106; 127/70, 32, 127/33; 426/463

[56] References Cited

U.S. PATENT DOCUMENTS

| | | | |
|---|---|---|---|
| 2,900,268 | 8/1959 | Rankin et al. | 106/150 |
| 3,657,010 | 4/1972 | Mitchell et al. | 127/70 |
| 3,901,725 | 8/1975 | Bond et al. | 127/70 |
| 3,921,333 | 11/1975 | Clendinning et al. | 523/123 |
| 3,932,319 | 1/1976 | Clendinning et al. | 525/440 |
| 3,943,000 | 3/1976 | Ferrara | 127/70 |
| 4,070,314 | 1/1978 | Alexander et al. | 524/14 |
| 4,120,983 | 10/1978 | del Valle et al. | 536/106 |
| 4,155,888 | 5/1979 | Mooth | 527/314 |
| 4,229,489 | 10/1980 | Chiu et al. | 536/106 |
| 4,587,332 | 5/1986 | Lane et al. | 536/106 |
| 4,597,928 | 7/1986 | Terentiev et al. | 524/14 |

OTHER PUBLICATIONS

Baum, et al., "Paper", *Encyclopedia of Chemical Technology*, vol. 16, pp. 768–803 (Kirk–Othmer ed.s, John Wiley & Sons, Inc., 3d ed., 1981).

Putnam, et al., "Papermaking Additives," *Encyclopedia of Chemical Technology*, vol. 16, pp. 803–825 (Kirk–Othmer ed.s, John Wiley & Sons, Inc. 3d ed., 1981).

Nissan, et al., "Cellulose", *Encyclopedia of Polymer Science and Technology*, vol. 3, pp. 131–137 and 181–184 (John Wiley & Sons, Inc., 1965).

Whistler, et al., *Starch: Chemistry and Technology*, pp. 38–45 (Academic Press, N.Y., N.Y., 1967).

*Primary Examiner*—Ronald W. Griffin
*Attorney, Agent, or Firm*—Michael F. Campbell; J. Daniel Wood

[57] ABSTRACT

A method of improving the utility of corn bran (i.e., hulls derived from milling) is provided. The corn bran is crosslinked with a polyvalent compound capable of forming a plurality of covalent bonds to one or more constituents of the corn bran. The crosslinked corn bran finds particular utility in papermaking. Paper furnishes and paper products derived therefrom are also provided.

11 Claims, No Drawings

CROSSLINKED CORN BRAN AND UTILIZATION IN PAPERMAKING

FIELD OF THE INVENTION

This invention relates to a method of improving the utility of crude corn bran. In another aspect, this invention relates to paper furnishes useful in producing paper products, e.g. linerboard paper stock.

BACKGROUND OF THE INVENTION

Milling of corn separates the hulls of the kernels of corn from the endosperms and germs of the kernels. The collected hulls are referred to as corn bran and are generally used as an animal dietary supplement. Corn bran is composed of cellulose, hemicellulose, and lignin precursors, e.g. ferrulic acid. Wet milling of corn produces large amounts of corn bran which are generally combined with corn gluten, starch and fibrous material that are also produced in the wet milling process and used as an animal feed, e.g. wet corn gluten feed. However, the economics of corn gluten feed markets are such that the production of such feed may impose an economic burden on the corn miller rather than a benefit. Accordingly, it would be desirable to find alternative uses for corn bran that may otherwise be considered a waste material resulting from corn milling.

SUMMARY OF THE INVENTION

This invention relates to a method of improving the utility of corn bran comprising reacting corn bran with a crosslinking agent and to a corn bran composition comprising the product of such a method. This invention further relates to a paper furnish comprising a crosslinked corn bran, and to paper products prepared from such furnishes. As used herein, the term "corn bran" shall refer to the product obtained by separating the hulls of grains of corn from the germ and endosperm of the grains. As also used herein, the term "crosslinking agent" shall refer to any material comprised of a chemical moiety which can interact with two or more hydroxyl-groups of the hydroxyl-functional constituents of corn bran to crosslink the same.

Attempts to use crude, i.e., chemically unmodified, corn bran as a source of fiber-contributing additive to a paper furnish composition were unsuccessful in that use of greater than nominal amounts of crude corn bran (more than 1% crude corn bran on a dry solids basis by weight of the suspended solids of a conventional paper furnish used for producing paper of linerboard quality) resulted in a consistently measurable deterioration in the properties of the resulting linerboard (e.g., reduced tensile strength). However, it has been found that even low levels of crosslinking of the corn bran, e.g., about 1% by weight crosslinking agent, lead to equivalent or improved properties in linerboard made from a furnish containing substantial amounts of crosslinked corn bran, e.g., greater than 2% by weight d.s.b. of the suspended solids of the paper furnish.

DETAILED DESCRIPTION OF THE INVENTION

The crosslinked corn bran of this invention is prepared from corn bran. Corn bran is obtained from the grain by convention milling techniques. In wet corn milling, which is the most common source of corn bran, corn kernels are steeped in dilute sulfurous acid to soften the outer layers of the grain. The moist corn kernels are then lightly ground in a mill to separate the intact germ from the remainder of the kernel. The germ is separated from the resulting cracked kernels by flotation of the germ. The resulting cracked kernels are powdered in a burr mill and the hulls (i.e. bran) are removed by screening the bran from the remaining starch and protein. The bran, which contains protein bound in a matrix comprised of hemicelluloses, cellulose and other constituents, are commonly used as, or to produce, a corn gluten feed.

As indicated above, the corn bran starting material of this invention is typically obtained by powdering shelled and degermed corn (zea maize) and screening the bran from the powdered starch and protein. Accordingly, the bran particles have a mean particle diameter in at least one dimension greater than the powdered starch and protein from which it is screened. A major portion of the weight of the bran will typically have a mean particle diameter in at least one dimension greater than about 1mm. It was found that when this crude bran was subjected to particle size reduction in a disc refiner of the type commonly used in pulp processing, the refined corn bran blinded even the slotted screen which is used to screen out extraneous material and through which the suspended solids of a conventional paper pulp can pass. However, crosslinking of the bran prior to disc refining, allowed passage of all the material through the slotted screen of the disc refiner and retention of almost all (e.g. 98%) of the crosslinked material on a 75 micrometer (200 mesh) screen used to retain the solids of a conventional pulp. Thus, the combined steps of crosslinking before further particle size reduction allowed handling of the bran in a conventional pulp production and collection apparatus.

The major constituents of crude corn bran are cellulose, hemicelluloses, and protein. These constituents, particularly the cellulose and hemicelluloses, are capable of reacting with a crosslinking agent. The physical and chemical characteristics of the bran as produced by milling can be further modified prior to crosslinking, e.g. particle size reduction, moisture content reduction, component extraction, but one of the advantages of the preferred embodiments of this invention is that such modifications are not generally necessary.

The corn bran and crosslinking agent can be admixed in any manner which will allow the bran and agent to come into reactive association. Typically the corn bran is slurried with a liquid compatible with the corn bran and crosslinking agent, e.g. water, and the crosslinking agent is added to the slurry. Such slurries typically contain less than 10% solids, by weight. However, it is contemplated that other techniques, e.g. fluidized bed techniques, will be useful to place the corn bran and crosslinking agent in reactive association.

As noted above, the crosslinking agents useful in this invention are compounds capable of reacting with the constituents of corn bran to form a plurality of covalent bonds thereto. Typical crosslinking agents are polyvalent compounds which react with the carbon-bonded hydroxyl groups of the hydroxyl-functional constituents of the corn bran (e.g. cellulose and/or hemicellulose) by replacing the active hydrogens of the hydroxyl groups with covalent bonds. Examples of such crosslinking agents are formaldehyde, condensates of formaldehyde and an organic compound having at least two active hydrogen atoms, particularly methylolamine crosslinkers (e.g. the reaction products of urea or melamine and formaldehyde), polyvalent acids (including acid halides, anhydrides, and/or esters thereof) (e.g. mineral acid halides such as phosphorous oxychloride, and organic diacids such as oxalic, fumaric, and succinic), polyaldehydes (e.g. glyoxal), polyepoxides, polyisocyanates (e.g. toluene diisocyanate); and divinyl compounds (e.g. divinyl sulfones).

Typical crosslinking agents are added to the corn bran at a level of from about 0.1% to about 10% by weight d.s.b. of the corn bran. The particular amount chosen will depend on the characteristics of the particular crosslinking agent and the desired degree of crosslinking. For example, the condensation of a mixture of urea and formaldehyde at a weight ratio of about 1:2, respectively, and at a level of from about 0.5% to about 2% by weight d.s.b. of the corn bran yields a moderately crosslinked corn bran, useful in this invention.

The corn bran need be subjected to no further processing to be useful as a fiber-contributing additive to a paper pulp, but may be de-watered (e.g. to reduce the cost of shipment to a pulping location).

The primary utility of the crosslinked corn bran of this invention is in paper furnishes used to make structural papers and paperboard, e.g. for packaging, construction, etc., where the mechanical strength of the paper or paperboard is of primary importance. Prior to addition to a paper furnish, the crosslinked corn bran is preferably pulped by mechanical refining. Such refining can be accomplished with a slurry of the corn bran alone or in admixture with a conventional pulp. Mechanical refining of pulps is undertaken to develop the cellulose fibers of the pulp. The fibers are swollen, cut, macerated and fibrillated which allows for enhanced fiber interaction in the formed sheet.

The basis weight of the papers and/or paperboard prepared from the paper furnishes of this invention will generally be greater than about 50 g/m², typically 50-100 g/m² for grocery bag papers, 125-450 g/m² for kraft linerboard, and 200-600 g/m² for folding boxboard. It has been found that the crosslinked corn bran may typically comprise up to about 50% by weight of the suspended solids of a paper furnish without unacceptably detracting from the desired mechanical strength of the paper. Typical amounts of crosslinked corn bran range from about 5% to about 40% by weight of the suspended solids, with from about 10% to about 25% being preferred.

The paper furnishes of this invention are otherwise conventional furnishes, i.e., dilute suspensions (e.g. about 0.1% to about 1% by weight solids) of cellulosic fibers containing various residual components of the pulp source, e.g. lignin and hemicellulose, as well as conventional additives. The paper furnish is formed into paper or paperboard by conventional methods. In general, the furnish is continuously deposited as a layer on a screen which serves to de-water the furnish and collect the fibers as a coherent mass. The layer is then processed to obtain a paper or paperboard sheet stock which can be converted as desired.

EXAMPLES

The following examples will serve to illustrate the invention and should not be construed to limit the invention as many other variations and/or modifications thereof will be within the spirit and scope of this invention. All parts, percentages, and ratios are by weight on a dry solids basis (d.s.b.) unless otherwise noted.

Crosslinked Corn Bran Procedure

A crosslinked corn bran was prepared by the following procedure. A center-stirred, 12-liter flask fitted with a thermometer and pH probe was charged with 2400 g wet corn hulls (taken from a de-watering press of a commercial wet milling operation and containing approximately 960 g, (40%) dry solids), 10.1 liter tap water, and 96 ml of an aqueous solution containing 6% by weight formaldehyde and 2.5% by weight urea. Approximately 28 gram of 30% aqueous sulfuric acid was added over 1 hour with stirring to lower the pH to about 2.5. The temperature was raised over about 1.5 hour to about 45° C. and then sufficient 20% aqueous sodium carbonate was added to raise the pH to about 3.2. The mixture as then stirred at about 45° C. for about 1.5 hour. Heating was discontinued and sufficient 20% aqueous sodium carbonate was added to raise the pH to 6.2. The resulting slurry was vacuum filtered and washed 4 times with 1 liter each tap water.

The above procedure was repeated using approximately twice the amount of urea formaldehyde solution (i.e. approximately 2% solids by weight of wet corn fiber solids).

A sample of corn bran was crosslinked with phosphorous oxychloride as follows. A center-stirred, 12-liter flask fitter with a thermometer and pH probe was charged with 1768 g of wet corn hulls (taken from a de-watering press of a commercial wet milling operation and containing approximately 700 g dry solids) and 7899 ml of water. Then, 70 g of sodium sulfate and 140 g of a 5% solution of sodium hydroxide were charged to the flask. The flask and contents were heated for about one hour to 45° C. during which time an additional 600 g of a 5% solution of sodium hydroxide was incrementally added to five the suspension of pH of about 10.5. Then 14 g of phosphorous oxychloride was added which lowered the pH to 8.3 and began the crosslinking reaction. About 10 minutes after the addition of the phosphorous oxychloride, an additional 100 ml of 5% sodium hydroxide was added which raised the pH to about 9.5. About 1½ hours after the addition of the phosphorous oxychloride, 56 g of aqueous 30% sulfuric acid was added to lower the pH to about 5 and thus stop the reaction. The insoluble yellow product was isolated by vacuum filtration of the reaction mixture and washed with deionized water.

Crosslinked Corn Bran Pulping Procedure

About 1 pound of the above urea-formaldehyde crosslinking corn bran having approximately 1% solids urea-formaldehyde crosslinker by weight of wet corn fiber solids, which had been stored at 40% solids for approximately four weeks in a cold room, was slurried in tap water as it was fed to a laboratory (Sprout-Waldron) disc refiner. Clearance of the blades was set at five ten-thousandths of an inch (contact was audibly detected running empty at between 0 and minus two ten-thousandths). Material was collected, screened through a vibrating slotted screen and collected on a 200 mesh pulp retention screen. It was estimated that less than a gram of material was retained on the slotted screen, and less than ten grams of soluble solids passed through in the filtrate (a sample of filtrate contained 0.2% solids). Thus, 95-98% of the material was retained in a 12% solids cakes on the pulp retention screen. In previous experiments, uncrosslinked corn bran refined to the above degree blinded even the slotted screen.

Paper Furnish Procedure

An aqueous slurry having 0.50% solids was prepared from the crosslinked and pulped corn bran by diluting 50 g solids to 1 liter with tap water, and mixed in various amounts with a 15% hardwood-85% southern pine chemical pulp furnish having 0.52% solids consistency obtained from a kraft linerboard mill.

Handsheet Procedure

Handsheets were prepared by collection of the pulp on a British sheet mold pressed on a Nobel-wood press, and dried on a flat press Emerson Speed drier at 140° F. (to minimize cockeling).

Handsheets were conditioned in a constant temperature and humidity room for three days, and physical properties measured.

Bulk density was calculated by dividing sheet weight by the average caliper of the sheet (in centimeters) times the calculated sheet area (190 cm$^2$). Three caliper readings were taken unless the sheet was badly wrinkled whereupon five readings were average. Caliper measurements varied by less than 6% in the worst case, and less than 4% on the average indicating good sheet formation.

Since at most, only three handsheets per composition were available, four Mullen Burst measurements were performed and the average value is reported. Scott Bond measurements were measured on a one inch strip cut from the middle of the least wrinkled sheet of a particular composition. Ring Crush measurements were measured on one-half by six inch strips carefully cut from undamaged specimens remaining after the Mullen Burst tests. Scott internal bond was not measured on samples 6, 7, and 8. The results of the tests are reported in Table I, below and graphically illustrated in FIGS. 1 and 2.

is more sensitive to formation and sheet density, did not diminish appreciably until higher than 6% bran levels. These data are graphically illustrated.

In summary, the handsheets prepared from a linerboard furnish incorporating up to 70% treated corn bran showed; a linear decrease in bulk density with increasing percent corn bran in the furnish; no decrease in Mullen burst strength at the 6% corn bran level, followed by a decrease proportional to the corn bran addition level; no decrease in Scott internal bond strength up to a 14% corn bran level; an increase or maintenance of ring crush strength up to the 27% corn bran level.

What is claimed is:

1. A method of improving the utility of corn bran comprising (a) reacting corn bran comprised of hydroxyl functional constituents with a crosslinking agent which forms a plurality of covalent bonds to one or more of the hydroxyl-functional constituents of said corn bran, and (b) mechanically refining said corn bran after said reacting.

2. A method of claim 1 wherein said corn bran prior to said reacting has a mean particle diameter in at least one dimension greater than the starch and protein from which it was separated prior to said reacting.

3. A method of claim 2 further comprising mechanically refining said corn bran after said reacting.

4. A method of claim 1 wherein a major portion of the weight of said corn bran prior to said reacting has a mean particle diameter in at least one dimension of at least about 1 mm.

5. A method of claim 1 wherein said compound is a polyvalent compound capable of reacting with the carbon-bonded hydroxyl groups of said corn bran.

6. A method of claim 1 wherein said compound is selected from the group consisting of methylolamino compounds, polyvalent acids, polyvalent acid esters,

TABLE 1

Linerboard Stock Handsheet Properties When Extended with Crosslinked Corn Bran

| EXAMPLE | PERCENT CORN BRAN (D.S.B.) | BASIS WEIGHT (gm/m$^2$) | BULK DENSITY (gm/cm$^3$) | RING CRUSH (LBS.) | SCOTT BOND | MULLEN BURST (PSI) |
|---|---|---|---|---|---|---|
| Control A | 0 | 57 | 0.52 | 6 | 143 | 26 |
| 1 | 13 | 53 | 0.44 | 3 | 130 | 28 |
| 2 | 25 | 53 | 0.38 | 8 | 136 | 17 |
| Control B | 0 | 90 | 0.53 | 17 | 135 | 65 |
| 3 | 6 | 93 | 0.52 | 21 | 136 | 63 |
| 4 | 14 | 90 | 0.48 | 15 | 129 | 51 |
| 5 | 27 | 89 | 0.43 | 17 | 94 | 37 |
| 6 | 49 | 72 | 0.35 | 8 | — | 18 |
| 7 | 69 | 64 | 0.34 | 5 | — | 4 |
| 8 | 62 | 68 | 0.33 | 6 | — | 11 |

At the fourteen percent corn fiber additive level and below, the appearance of the paper was judged acceptable. At 27% corn fiber flecks of "hull" are readily visible, but still would be acceptable for corrugating medium.

There are visible differences between the all-kraft and even the 6% corn bran sample. These appearance differences would likely be minimized in paper prepared using more highly refined corn bran (which has been more highly crosslinked).

An interesting result found was that bulk density decrease in direct proportion to the percent corn bran in the sheet, while the two important parameters, Scott internal bond strength and ring crush strength were maintained until somewhere between 14 and 27% corn bran in the furnish. Even Mullen burst strength, which polyvalent acid halides, polyvalent acid anhydrides, polyaldehydes, polyepoxides, polyisocyanates, and divinyl compounds.

7. A method of claim 1 wherein said compound is a methylolamino compound selected from the group consisting of condensates of formaldehyde with urea or melamine.

8. A method of claim wherein said compound is phosphorous oxychloride.

9. A method of claim 1 wherein said compound is present at from about 0.1% to about 10% by weight of said corn bran.

10. A method of improving the utility of corn bran comprising (a) reacting corn bran, said corn bran having a mean particle diameter greater than the starch and protein from which it was separated and comprised of constituents having carbon bonded hydroxyl groups, with a crosslinking agent having a plurality of groups which react with the carbon-bonded hydroxyl groups of said corn bran, methylolamine compounds, polyvalent acids, polyvalent acid esters, polyvalent acid halides, polyvalent acid anhydrides, polyaldehydes, polyepoxides, polyisocyanates and divinyl compounds, wherein said polyvalent compound is present at from about 0.1% to about 10% by weight of said corn bran, and (b) mechanically refining said corn bran after said reacting.

11. An improved corn bran composition comprising the product of the reaction of claim 1.

* * * * *